United States Patent
Stokes

(10) Patent No.: US 7,573,396 B2
(45) Date of Patent: Aug. 11, 2009

(54) AIR CRAFT EMERGENCY LIGHTING SYSTEM

(75) Inventor: Peter David Stokes, North Elmham (GB)

(73) Assignee: SAF-T-GLO Limited, Norfolk (GB)

( * ) Notice: Subject to any disclaimer, the term of this patent is extended or adjusted under 35 U.S.C. 154(b) by 344 days.

(21) Appl. No.: 11/663,405

(22) PCT Filed: Sep. 21, 2005

(86) PCT No.: PCT/GB2005/003639

§ 371 (c)(1),
(2), (4) Date: Mar. 21, 2007

(87) PCT Pub. No.: WO2006/032883

PCT Pub. Date: Mar. 30, 2006

(65) Prior Publication Data

US 2008/0101078 A1    May 1, 2008

(30) Foreign Application Priority Data

Sep. 21, 2004 (GB) ............... 0420884.9
Jan. 12, 2005 (GB) ............... 0500528.5
May 6, 2005 (GB) ............... 0509266.3

(51) Int. Cl.
*G08B 23/00* (2006.01)
*G08B 1/00* (2006.01)
*B64D 47/02* (2006.01)

(52) U.S. Cl. .............. 340/693.2; 340/514; 340/945; 340/636.1; 340/691.1; 340/693.1; 340/332; 340/333; 307/64; 307/10.8; 315/86; 362/470; 362/471

(58) Field of Classification Search ............. 340/693.2, 340/333; 362/470, 471
See application file for complete search history.

(56) References Cited

U.S. PATENT DOCUMENTS

| 4,365,232 | A  | 12/1982 | Miller |
| 6,422,723 | B1 | 7/2002 | Walters |
| 6,754,602 | B1 | 6/2004 | Tkachenko et al. |
| 2002/0080027 | A1 | 6/2002 | Conley, III |

FOREIGN PATENT DOCUMENTS

| GB | 2 207 538 A | 2/1989 |
| GB | 2 359 616 A | 8/2001 |
| WO | WO 2004/008261 A2 | 1/2004 |

*Primary Examiner*—Donnie L Crosland
(74) *Attorney, Agent, or Firm*—Greer, Burns & Crain, Ltd.

(57) ABSTRACT

An aircraft emergency lighting system including: a plurality of units having communication devices arranged to communicate wirelessly with a master controller, wherein each unit is wired to a common power supply for powering the unit in a first mode of operation and has its own back-up battery power supply for powering the unit in a second mode of operation, and wherein the device is provided for off-load testing the back-up battery power supply of each unit and indicating if the unit is operational.

21 Claims, 3 Drawing Sheets

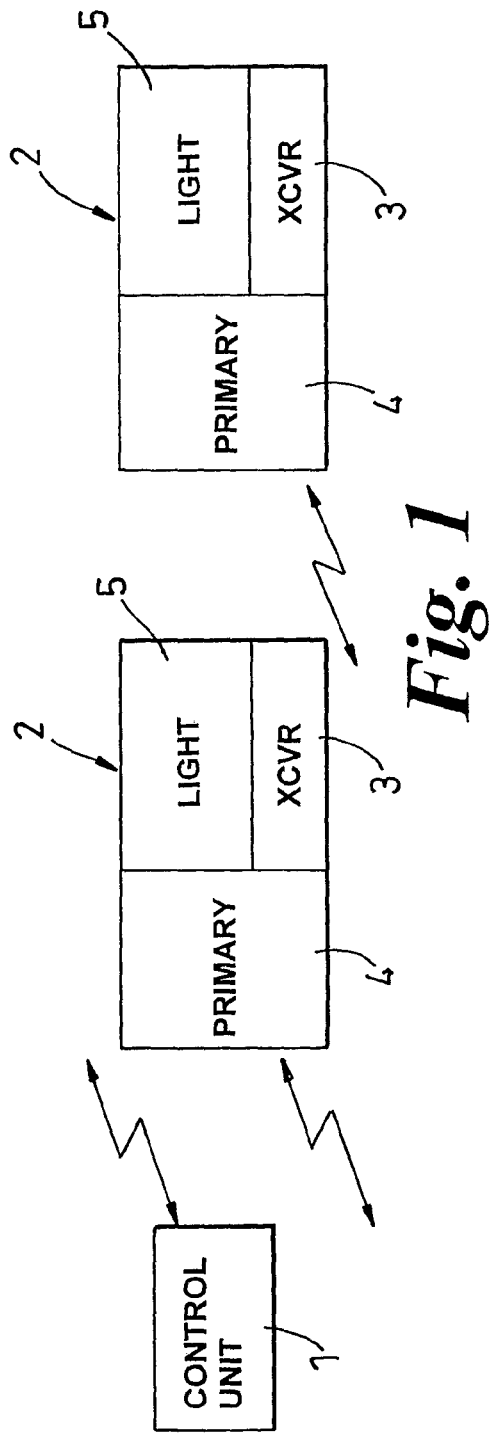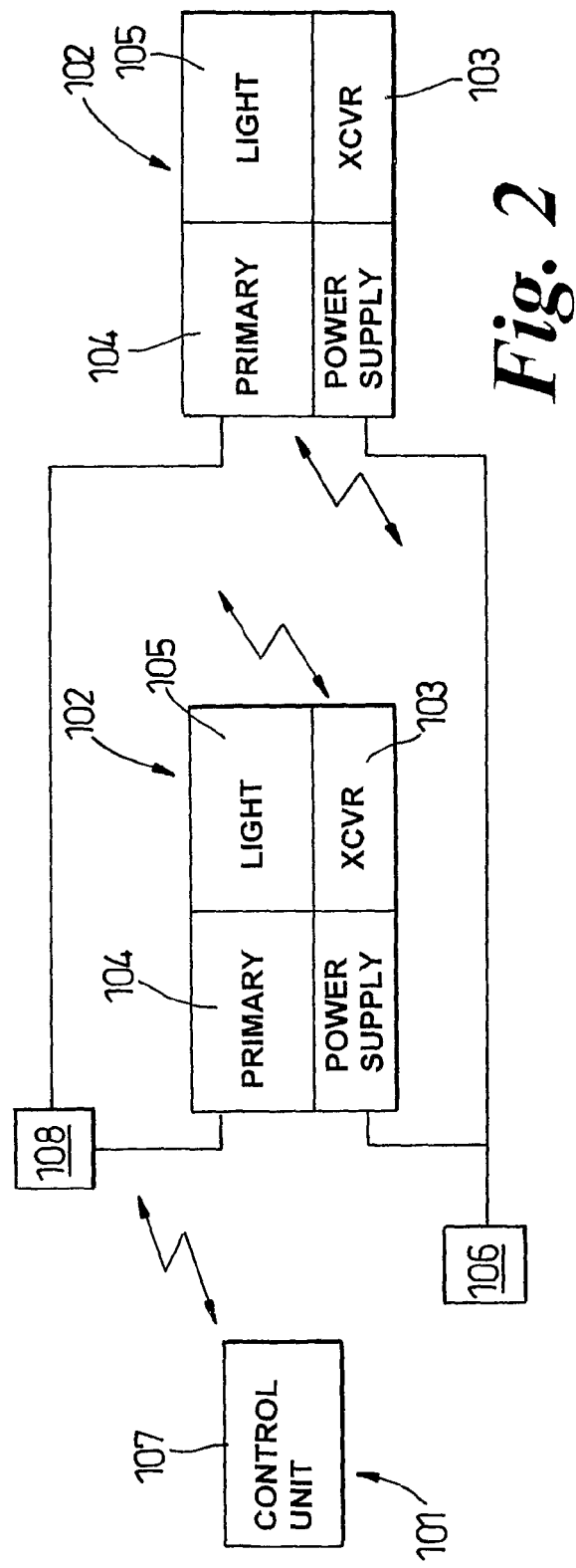
Fig. 1
Fig. 2

AIR CRAFT EMERGENCY LIGHTING SYSTEM

This invention concerns improvements in or relating to onboard equipment for aircraft and the like. The invention has particular, but not exclusive application to powered units employed for a variety of purposes, especially powered units such as may be used for emergency lighting for aircraft to guide passengers to an exit when it is desired to evacuate the aircraft. The invention further relates to batteries for such powered units and more especially to a system for monitoring service life of a battery to provide an indication when the battery may need to be replaced/recharged.

In our co-pending International patent application No. PCT/GB2003/003006 we describe a wireless emergency lighting system for an aircraft wherein operation of battery powered light units is controlled via a master controller arranged to communicate wirelessly with the light units. The master controller is also operable to interrogate the light units to obtain information on the health and status of each unit at regular intervals during the service life of the aircraft.

By providing each unit with its own battery power supply and arranging the units to communicate wirelessly, installation of the system is facilitated and operation of the system in an emergency does not rely on the aircraft power supply. The system is especially suitable for the original equipment market where the advantages of the system can be optimised. In particular, when used for emergency lighting in new aircraft, no wiring connections are required providing greater choice and flexibility in the design of the light units for installation in different locations within the aircraft.

These advantages of the system may be reduced for the retrofit market where the lay-out of the emergency lighting is fixed. For example, when replacing existing emergency lighting, any changes to the lay-out of the system may require new approvals to be obtained that would add significantly to costs. As a result, the light units have to be designed for installation in the same position and this may require different designs for different locations in the same aircraft and/or for different aircraft. This adds to the costs.

In the existing arrangement, battery power is required both for the routine diagnostic checks of the light units and for operating the light units in an emergency. The routine diagnostic checks require very little power but together with self-discharge of the batteries, there is a risk that, over time, the batteries may be drained to a level at which there is insufficient power remaining to operate the light unit in an emergency.

This risk can be reduced by the use of re-chargeable batteries but, even with current technology, re-chargeable batteries only have a typical service life of about 4-5 years whereas the service life of an aircraft is typically around 20 years. Accordingly, it is likely the batteries will have to be replaced at least three times during the service life of the aircraft which, together with the need to re-charge the batteries, adds to maintenance costs, especially while the aircraft is out of operation.

Both types of battery, re-chargeable and non-re-chargeable, are subject to self-discharge that drains the residual power of the battery during periods of non-use. The amount the battery is discharged is affected by the conditions in which it is maintained, particularly temperature. As a result, it is difficult to predict with any degree of accuracy the loss of power over a period of time without some method of monitoring the battery.

The power remaining in the batteries is crucial in determining whether or not the emergency lighting system is capable of operating satisfactorily. Attempts to measure the absolute power remaining are generally complicated while measuring the amount of power used by so called "coulomb counting" and using this to calculate the power remaining are unreliable as they fail to take account of the variable capacity loss resulting from self-discharge and the effect on this of different conditions.

The present invention has been made from a consideration of the foregoing requirements and seeks to provide solutions having advantages for both the original equipment market and the retrofit market.

Thus, the invention seeks to provide a system, especially an aircraft emergency lighting system, with battery powered units in which battery life is enhanced.

More especially, the invention seeks to provide a system in which the power drain on the battery is reduced or eliminated for non-emergency use of the system.

In addition, the invention seeks to provide a battery that enables the power remaining in the battery to be monitored so that an indication can be provided when the battery may need to be replaced.

Furthermore, the invention seeks to provide a method of monitoring the power remaining in a battery in an efficient manner.

Thus, according to a first aspect of the present invention, we provide a system for a vehicle such as an aircraft comprising a plurality of units having communication devices arranged to communicate wirelessly with a master controller wherein each unit is wired to a common power supply for powering the unit in a first mode of operation and has its own back-up battery power supply for powering the unit in a second mode of operation.

The first mode of operation may be employed under normal conditions and the second mode of operation may be employed under emergency conditions. For example, where the units are part of an onboard emergency lighting system in an aircraft, the units may be wired to the aircraft power supply for the other aircraft systems.

In this way, under normal conditions, when the emergency lighting is not required, operation of the units, for example during installation and routine testing of the units, is powered by the aircraft power supply. As a result, the back-up battery power supply is conserved for operating the units in an emergency when the aircraft power supply fails or the wiring between the aircraft power supply and the units is damaged or broken such as following a crash By employing the aircraft power supply to power the units under normal operating conditions, full power is only drawn from the back-up battery power supply in an emergency thereby conserving battery power until it is required. As a result, non re-chargeable (primary) batteries can be used as there is no significant drain of the battery power during normal operating conditions.

Moreover, by employing the aircraft power supply to power the units under normal operating conditions, the back-up battery power supply is not drained by inadvertent turn-ons of the system. As a result, battery service life may be extended with little or no battery maintenance required.

In this way, we may reduce the number and/or size of the batteries employed for this back-up function in each unit with potential cost savings both directly in terms of the batteries and indirectly in terms of the reduction in weight. We may also increase the service interval for replacement of the back-up batteries with further potential cost savings both directly in terms of the number of batteries used and indirectly in terms of the reduction in maintenance required.

Indeed, we have found that by minimising battery drain through leakage, then some types of batteries become passivated quickly when subject only to self discharge, thus preventing any further self discharge, and it may be possible as a result to extend the battery service life of the non-chargeable batteries employed beyond the service life of the aircraft, typically 20 years, by using batteries that retain a high capacity even after a prolonged period of storage. In this way, battery replacement may normally only be required following emergency use. We prefer to use lithium batteries, especially lithium sulphur dioxide or lithium manganese dioxide batteries, but any other suitable battery that does not gradually self-discharge when not in use may be employed.

Preferably, where the system is employed in emergency lighting in an aircraft, manually operable switch means are provided for switching the system between different states. For example, the system may be switched between "off", "armed" and "on" states. Typically, the switch means is provided in the cockpit for operation by the flight crew but additional switch means may be provided at other locations for operation by the cabin crew.

Normally, the system is switched to the "off" state when the aircraft is on the ground and is switched to the "armed" state by the flight crew prior to take-off and remains in this state until the aircraft lands when it is switched back to the "off" state.

In the "off" state, power is supplied to the units when the aircraft power supply is operating, either from a main generator when the engines are running or from an auxiliary generator when the engines are not running, for example when the aircraft is on the ground between flights. In this state, the emergency lighting is turned off and no power is drawn from the back-up batteries even if the aircraft power supply is interrupted for any reason.

In the "armed" state, power is again supplied to the units when the aircraft power supply is operating and the emergency lighting is turned off with no power being drawn from the back-up batteries. In this state, however, if the aircraft power supply is interrupted, the emergency lighting automatically comes on powered by the back-up batteries. If the aircraft power supply is restored, the emergency lighting is turned off.

If the system is manually switched to the "on" state when the aircraft power supply is operating, the emergency lighting comes on powered by the aircraft power supply and no power is drawn from the back-up batteries. If the aircraft power supply fails, the emergency lighting will remain on powered by the back-up batteries. If the aircraft power supply is restored, the emergency lighting will remain again powered by the aircraft power supply.

As will now be appreciated, the back-up battery power supply is only employed when the aircraft power supply fails in a condition in which the emergency lighting is required. In other conditions, the aircraft power supply is used for all requirements of the system.

The emergency lighting can be manually switched off after coming on by switching to the "off" state. For example, if the emergency lighting comes on automatically during a flight, the flight crew can turn it off to conserve battery power until the emergency lighting is required to assist escape from the aircraft after landing.

The units may include a timer to switch the emergency lighting off automatically after a pre-determined period of time, for example 15 minutes, and/or when the battery power has reduced to a pre-determined level, for example 40% of the nominal no-load voltage.

Preferably, the batteries are chosen to provide a power supply for operating the emergency lighting for at least two and more preferably at least three times the automatic switch-off period of time. For example, the batteries may provide at least 50 minutes operation of the emergency lighting. In this way, the system remains operational even after a switch-on.

Where the units are used as part of an emergency lighting system, each unit may be provided with a single light source. Alternatively, each unit may act as a hub for a plurality of light sources. In some applications, a combination of both types of unit may be employed. The light sources may be of any suitable type for example incandescent bulbs or LEDs.

Preferably, the units are provided with built-in test equipment (BITE) and the communication devices allow remote communication with the BITE from the master controller to carry out a range of functions.

In one arrangement, each unit has a transceiver for receiving and transmitting information between the units and the master controller. The BITE may be responsive to signals from the master controller to provide information relating to the health/status of each unit.

For example, where the units are part of an emergency lighting system, the BITE may carry out one or more diagnostic checks such as a battery life check, light source check, and circuit integrity check and transmit a pass/fail signal to the master controller for each check. In this way, the master controller can determine if the emergency lighting system meets the minimum requirements for take-off.

Preferably, the master controller comprises a diagnostic control panel. In one arrangement, the diagnostic control panel is connected to one of the units that then becomes a "lead" unit with the other units becoming "slave" units. In use, the control panel employs the transceiver of the lead unit to communicate wirelessly with the slave units. The control panel may be connectable to any of the units providing flexibility for installation of the control panel. In another arrangement, the diagnostic control panel is separate from the units and communicates wirelessly with any unit within range.

The diagnostic control panel preferably provides a report on the check carried out. The report may be visual, for example in the form of a display, and/or audible, for example a buzzer. The display may be in any suitable form. For example, the control panel include a screen such as a plasma or LCD screen on which the report can be displayed.

The report may identify the location of each unit, whether a unit has passed or failed and provide an indication of any detected fault in a unit. The control panel may also store the report for downloading, for example to a laptop or other suitable device, for use in monitoring the health of the system during the service life of the aircraft. This may assist in maintenance of the system.

In one arrangement, the control panel has means such as an array of buttons for manually initiating various functions and providing a visual and/or audible indication whether the system passes or fails.

The control panel may have a traffic light system with differently coloured LEDs, such as red, amber, green, that are illuminated to indicate if the system has passed or failed.

Thus, red indicates the system has failed, amber indicates the system meets the minimum requirements for take-off but one or more units requires maintenance, and green indicates all the units are fully operational.

The control panel may be located in the cockpit for operation by the flight crew. Alternatively, it may be located in the cabin for operation by the cabin crew and may provide a pass/fail signal in the cockpit.

Preferably, the BITE is only operable when the system is in the "off" state, and the aircraft power supply is operating. In this way, operation of the BITE does not drain the back-up batteries.

Normally, the "off" state is selected when the aircraft is on the ground and the BITE is not operable during flight when the "arm" state is selected. In this way, any suitable frequency can be employed for operation of the BITE without risk of interfering with the aircraft systems.

As a result, we are not limited to using a low power frequency to avoid interference and we prefer to use a single frequency channel of 2.4 Ghz. This is a licence free frequency in most countries and its use does not require any approvals. Furthermore, this frequency will usually enable all slave units to communicate directly with the control panel via the lead unit.

In this way, cascading of signals between units as described in our aforementioned International application may not be required. Of course, we may include provision for cascading signals if desired for any reason such as to enhance reliability.

As will be understood, by arranging for the BITE to be operable when the aircraft is on the ground and power is available from the aircraft power supply, the BITE can carry out a wider range of functions for monitoring the health/status of the system without draining back-up batteries. Additionally, physical mapping of the location of individual units via power cabling sockets may be facilitated.

According to a second aspect of the present invention, we provide in or for an aircraft a unit for an on-board system connectable to the aircraft power supply to provide a primary source of power and a back-up power supply comprising one or more non-rechargeable batteries to provide a secondary source of power if the aircraft power supply fails.

Preferably, the capacity of the non-rechargeable batteries is not significantly depleted, even after a prolonged period of storage. In this way, the batteries retain sufficient power to operate the units in an emergency when the aircraft power supply fails.

Lithium batteries, in particular lithium sulphur dioxide and lithium manganese dioxide, are found to be especially suitable when used as the back-up batteries and may provide a service life beyond the service life of the aircraft. In this way, battery maintenance is minimised and the batteries may only require replacement after use in an emergency.

In one arrangement, the unit has a single battery which is the operational standby battery. In another arrangement, the unit has two batteries, one being the operational standby battery and the other being a "reserve" battery.

In the latter arrangement, the reserve battery is completely disconnected from any part of the unit by a non solid state switch device (therefore no leakage) so that power is not drawn from the reserve battery and, when the first 'operational' battery is 'out of life' which may be sensed when the operational voltage drops to a predetermined level under load, the reserve battery switches over to become the 'operational' battery.

In this way, both batteries (operational and reserve) are subject to the same environmental conditions so that the reserve battery is progressively always in a higher state of capacity than the operational battery which is always subject to leakage (albeit very small) and will therefore always have less capacity than the reserve battery. As a result, the reserve battery will always have more capacity than the operational battery and gives an effective method of always having emergency power available without the necessity to monitor status of the operational battery.

A plurality of units may be employed in the system above-described, for example to provide an emergency lighting system for an aircraft.

According to a third aspect of the present invention, there is provided a battery comprising a plurality of cells connected in series wherein at least one of the cells has a lower initial charge than the remaining cells.

By connecting the cells in series, all the cells will be subjected to exactly the same load conditions and, by providing one of the cells with a lower initial charge, this cell will fail before the remaining cells. This cell, which is referred to hereinafter as a "sacrificial cell" for convenience, can be used to provide an indication when the battery may need to be replaced.

For example, by providing the sacrificial cell with an initial charge of known value and monitoring the power level of the cell, the power remaining in the battery from the other cells when the sacrificial cell fails will be known and can be set so that there is sufficient power to operate a light unit or other device connected to the battery.

In this way, the sacrificial cell provides a simple and reliable means of monitoring the battery to identify when power remaining in the battery has reached a pre-determined minimum threshold value at which the battery may need to be replaced.

In a preferred arrangement, the sacrificial cell is connected to a test circuit for monitoring the cell and providing an indication when the power level of the cell is such that the battery needs to be replaced. For example, the test circuit may provide a visual and/or audible warning when the battery needs to be replaced.

The test circuit may be arranged to provide a series of warnings as the power level in the cell approaches that at which the battery needs to be replaced. In this way, an advance warning may be provided while there is still sufficient power remaining in the battery for its intended purpose. For example, in the case of emergency lighting for an aircraft, such advance warning may allow the aircraft to continue in service until it is convenient to replace the battery.

According to a fourth aspect of the present invention, there is provided an emergency lighting system for assisting evacuation of an aircraft, the system comprising a plurality of light units, each light unit having a battery power source comprising the battery according to the third aspect of the invention.

The light units may be arranged to guide passengers to an exit and/or to identify the exit. For example, the light units may provide illumination along one or both sides of an aisle leading to the exit and/or illumination of the exit.

The battery may provide the sole power source for each light unit and the light units may be arranged to communicate wirelessly with a master control unit for controlling operation as described in our afore-mentioned International patent application No. WO 2004/008261.

Alternatively, each light may be wired to the aircraft main power supply and the battery arranged to provide a back-up power source if the aircraft main power supply fails, for example in an emergency, as described above in the first and second aspects of the invention.

Preferably, the battery is a non-re-chargeable (primary) battery and the initial power level of the sacrificial cell is reduced by a known amount relative to the initial power level of the remaining cells. For example, the sacrificial cell may have an initial capacity of up to 90% of the initial power level of the remaining cells. We may discharge the sacrificial cell to achieve the required initial power level.

Preferably, the non-re-chargeable (primary) battery is a lithium battery, for example a lithium sulphur dioxide or lithium manganese dioxide battery. It will be understood, however, that other non-re-chargeable batteries with suitable characteristics and service life may be employed.

According to a fifth aspect of the invention, there is provided a battery management system comprising a battery having a plurality of cells connected in series, wherein at least one of the cells has a lower initial power level than the remaining cells, and means for monitoring said at least one cell and providing an indication of a pre-determined power level lower than said initial power level.

The battery management system may be provided as part of an emergency lighting system as described in our afore-mentioned International patent application No. WO 2004/008261 or as described herein in accordance with any of the aspects of the present invention.

According to a sixth aspect of the invention, there is provided a method of monitoring battery power level comprising providing a battery with a plurality of cells connected in series, providing at least one of said cells with an initial power level lower than the remaining cells, monitoring the power level of said at least one cell and providing an indication of a pre-determined power level lower than said initial power level.

The method of monitoring battery power level may be employed in an emergency lighting system as described in our afore-mentioned International patent application No. WO 2004/008261 or as described herein in accordance with any of the aspects of the present invention.

According to a seventh aspect of the invention, there is provided an emergency lighting system for assisting evacuation of an aircraft, the system comprising a plurality of light units, each light unit having a power source comprising at least one battery having a plurality of cells arranged in at least two groups wherein a characteristic of each group of cells is monitored and compared for detecting a fault in any of the cells.

By arranging the cells in groups, preferably with an equal number of cells in each group, each group of cells should be substantially the same in a healthy battery and, by monitoring and comparing a characteristic of each group, a fault can be identified when a comparison of the monitored characteristic identifies a deviation greater than a permitted minimum.

Preferably, centreline voltage monitoring is used for checking the service life of the battery in an off-load condition so testing does not use any battery capacity. The off-load voltage varies with temperature, but the cell-to-cell variation with no load is normally very small, unless there is a fault with one of the cells and it has become discharged.

Preferably, the cells are arranged in two groups and a mid-battery tap is used to compare the two groups of cells. In this way, if a cell in one of the groups is faulty, the two off-load voltages will not be equal, regardless of temperature. As battery capacity is not used, off-load testing can be made at regular intervals, for example daily, with no impact on battery life.

In a preferred arrangement, the mid-battery tap is connected to a test circuit for testing the battery and providing an indication when a fault is detected and the battery needs to be replaced. For example, the test circuit may provide a visual and/or audible warning when the battery needs to be replaced.

As will be appreciated, centerline voltage monitoring enables an indication of (at worst) odd numbers of cells with faults to be determined with reasonable certainty that is simpler than monitoring and comparing the individual cell voltages.

The off-load test only identifies if there is a fault in the battery requiring the battery to be replaced. It does not provide an indication of the capacity of the battery and therefore if there is sufficient capacity to operate the emergency lighting when required.

Preferably, on-load testing to measure the capacity remaining in the battery is also employed to identify when a battery may need to be replaced. The on-load test uses up battery charge, typically at least 20 seconds, and is therefore carried out less frequently than the off-load testing used to detect a fault in the battery. For example, on-load testing once a year to check that there is sufficient capacity remaining for an emergency discharge may be sufficient.

The on-load test may also be arranged to provide an indication when a battery needs to be replaced. For example, a visual and/or audible warning may be generated when the battery needs to be replaced. The on-load test may be arranged to indicate when the power level in the cell approaches that at which the battery needs to be replaced.

In this way, an advance warning may be provided while there is still sufficient power remaining in the battery for its intended purpose. Such advance warning may allow an aircraft to continue in service until it is convenient to replace the battery.

The light units may be arranged to guide passengers to an exit and/or to identify the exit. For example, the light units may provide illumination along one or both sides of an aisle leading to the exit and/or illumination of the exit.

Preferably, the battery is a non-re-chargeable (primary) battery such as a lithium battery, for example a lithium sulphur dioxide or lithium manganese dioxide battery. It will be understood, however, that other non-re-chargeable batteries with suitable characteristics and service life may be employed.

The battery may provide the sole power source for each light unit and the light units may be arranged to communicate wirelessly with a master control unit for controlling operation as described in our afore-mentioned International patent application No. WO 2004/008261.

Alternatively, each light may be wired to the aircraft main power supply and the battery arranged to provide a back-up power source if the aircraft main power supply fails, for example in an emergency, as described above in the first aspect of the invention.

According to an eighth aspect of the invention, there is provided a method of monitoring battery service life comprising providing a battery with a plurality of cells arranged in at least two groups, monitoring and comparing a characteristic of each group and providing an indication when a pre-determined difference between the characteristics is detected.

Preferably, the off-load voltage of each group is monitored and compared such that testing does not drain the battery capacity.

Preferably, the cells are divided into two groups containing an equal number of cells.

Preferably, on-load testing to measure the capacity remaining in the battery is also employed to identify when the battery may need to be replaced.

The on-load test uses up battery charge, typically at least 20 seconds, and is therefore carried out less frequently than off-load testing. For example, on-load testing may be done once a year to check that there is sufficient capacity remaining for an emergency discharge.

The on-load test may also be arranged to provide an indication when a battery needs to be replaced. For example, a visual and/or audible warning may be generated when the battery needs to be replaced.

The on-load test may be arranged to indicate when the power level in the cell approaches that at which the battery needs to be replaced. In this way, an advance warning may be provided while there is still sufficient power remaining in the battery for its intended purpose. Such advance warning may allow an aircraft to continue in service until it is convenient to replace the battery.

Embodiments illustrating the various aspects of the invention will now be described in more detail by way of example only with reference to the accompanying drawings wherein:—

FIG. 1 shows an emergency lighting system of the type described in our co-pending International patent application No. PCT/GB2003/003006;

FIG. 2 shows diagrammatically a first embodiment of an emergency lighting system according to the present invention;

Figure 3:
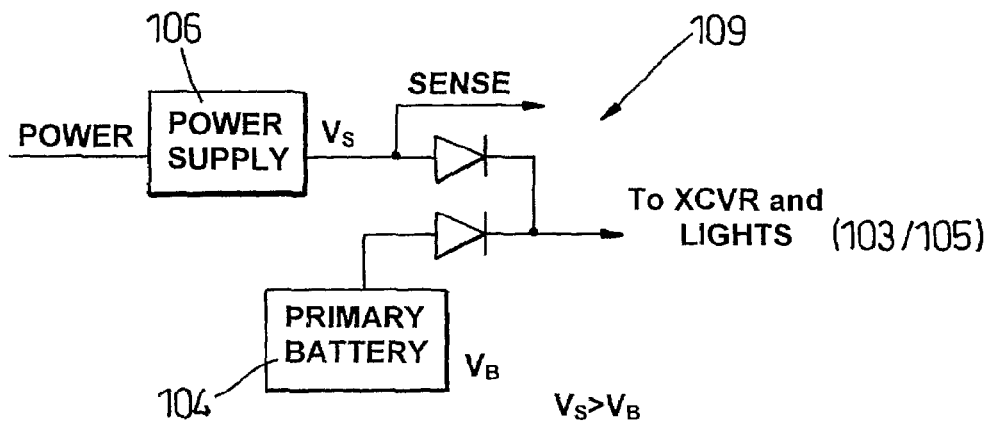
FIG. 3 shows diagrammatically a circuit for controlling the power supply of the light units shown in FIG. 2.

Referring first to FIG. 1 of the accompanying drawings, an aircraft emergency lighting system of the type described in our International Patent Application No. WO 2004/008261 is shown comprising a master control unit 1 and a plurality of light units 2 (two only shown).

The light units 2 are positioned at desired locations in the cabin to identify and/or guide passengers to the exit doors in an emergency. The master control unit 1 communicates wirelessly with the light units 2 via transceivers 3 associated with the light units 2 using spread spectrum communication.

Signals are cascaded in a random manner to and from the master control unit 1 and the light units 2 for relaying messages between units to increase the range and reliability of the system.

Each light unit 2 is powered by a primary (non-rechargeable) battery 4 and is arranged to cycle between an operable (awake) condition in which it can receive/transmit a signal and an inoperable (sleep) condition in which it does not receive/transmit a signal to conserve battery power.

Each light unit 2 may also communicate with the master control unit 1 in both a stand-by mode and an armed mode to provide information to the master control unit on the status/health of the unit 2 but only respond to a switch-on signal to illuminate a light source 5 in the armed mode.

The reader is directed to our co-pending International patent application No. WO 2004/008261 for a further description of the system.

It will be understood that the above system has the advantage that the light units are entirely separate from each other and from the master control unit. As a result, installation of the system does not require a mains converter or hard wiring connections from the aircraft power supply to the units.

The above system is particularly useful when employed in a system that is to be used in an emergency only, for example an emergency lighting system, where cycling between the "awake" and "sleep" conditions conserves battery power.

In this way, we have been able to achieve an acceptable service life using primary batteries as the only power source for the units in preference to more expensive and heavier rechargeable batteries that require additional circuitry and power source for re-charging.

The system, however, still requires routine health checks to be carried out at regular intervals to ensure that the system is capable of operation in an emergency. These health checks require the units to be powered to receive and send messages to and from the master control unit.

As a result, the battery life is reduced and this restricts the type, number and frequency of the checks that can be carried out in order to maintain an acceptable battery life.

Referring now to FIGS. 2 and 3 of the accompanying drawings, there is shown a first embodiment of an aircraft emergency lighting system according to the present invention. For convenience, like reference numerals in the series 100 are used to indicate parts corresponding to the system described above with reference to FIG. 1.

In this embodiment, a plurality of light units 102 are hard wired to the aircraft power supply 106 that is provided for other systems in the aircraft. The aircraft power supply 106 may be a primary generator providing power when the engines are running or a secondary generator providing power when the engines are not running.

The light units 102 include transceivers 103 for receiving and transmitting signals to and from a master controller 101 in the form of a diagnostic control panel 107 for carrying out diagnostic checks on the status of the emergency lighting system as described later.

In this embodiment, the diagnostic control panel 107 is connected to one of the light units 102 which becomes a "lead" unit and employs the transceiver 103 of the lead unit to communicate wirelessly with the other units which become "slave" units.

This is not essential however and, in another embodiment (not shown), the diagnostic control panel 107 is a separate unit that is not connected to any of the light units 102 and communicates wirelessly with all the units 102.

Wireless communication with any unit may be direct, where the unit is within range or indirect (cascaded) through another unit where the unit is out of range of the control panel.

In this embodiment, wireless communication is used for operating BITE (not shown) associated with each light unit 102 to carry out checks on the health/status of the light units 102 and is not used to switch the light units 102 between different operating states.

The BITE is used to check the emergency lighting system meets the minimum requirements for take-off (MEL) and is not employed during flights.

In this way, operation of the BITE while the aircraft is on the ground does not interfere with operation of other aircraft systems required during flight.

As a result, the wireless communication can employ a high power signal enabling all the units 102 to communicate directly with the control panel 107 without having to cascade signals between the units 102 in a random manner.

We prefer to use a single radio frequency channel centred on 2.4 GHz but it will be understood that other frequencies can be employed with or without cascading of signals between the units 102.

The emergency lighting system is connected to a control switch 108 in the cockpit. The control switch 108 is manually operable by the flight crew to switch the system between different states—an "off" state, an "armed" state and an "on" state.

The system is normally in the "off" state when the aircraft is on the ground between flights or is out of service for any reason. In this state, the batteries 104 are isolated and power to the light units 102 is provided by the aircraft power supply only.

The BITE is operable in the "off" state when power is available from the aircraft power supply to carry out health and status checks on the light units 102 without drawing power from the batteries 104.

For example, the BITE may provide a battery life check, a light source check and a circuit integrity check, and provide a signal to indicate the condition of the emergency lighting system.

The control panel 107 may include a traffic light system with three coloured lights—red, amber, green—and is operable to illuminate any one of these following a health and status check.

The red light indicates that the emergency lighting system does not meet the minimum requirements for despatch (take-off) and the aircraft is grounded until maintenance work is carried out to rectify the faults.

The amber light indicates that the emergency lighting system meets the minimum requirements for despatch but that at least one unit requires maintenance, e.g. replacement of a faulty light source.

The green light indicates that the emergency lighting system meets the minimum requirements for despatch and that all the units are operational, i.e. no maintenance required.

The health and status check is carried out at least once each day when the aircraft is in service but may be carried out more regularly, for example before each flight if desired, as no power is drawn from the batteries 104 by such checks.

In addition, each unit 102 is provided with an infra-red data (IRDA) interface (not shown) in the form of a light guide for local interrogation and/or programming of the unit 102. It will be understood, however, that any other suitable interface may be provided for transferring data to and from the unit, for example a USB port.

The light guide has ports for receiving and transmitting signals for inputting/extracting data on the health/status of the unit 102, for example during routine maintenance of the unit 102.

The light guide also has a port for a test light operable locally by a test switch to provide a visual indication of the health of the unit 102. In this way, the units 102 can be checked individually, for example if the diagnostic panel 107 is broken or malfunctioning.

In use, the emergency lighting system is switched from the "off" state to the "armed" state prior to take-off, and is switched back to the "off" state at the end of the flight. In this state, the units are powered by the aircraft power supply and the light sources are switched off.

If the aircraft power supply is interrupted in the "armed" state, the emergency lighting comes on automatically powered by the batteries 104. If the aircraft power supply is restored, the emergency lighting goes off.

The circuitry controlling the power to the light sources includes means (not shown) to switch off automatically the emergency lighting after it has come on in the "armed" state to conserve battery power.

Such means may switch-off the lighting after a pre-determined period of time or when the battery power has reduced to a pre-determined level whichever occurs first.

As will now be appreciated, under normal conditions, power to illuminate the light source 105 of the units 102 and to operate the transceivers 103 for carrying out diagnostic health checks is provided by the aircraft power supply 106.

Power is only drawn from the batteries 104, under emergency conditions when the aircraft power supply 106 has failed, for example following a fire, crash or other occurrence interrupting the aircraft power supply to the light units 102. FIG. 3 shows a suitable circuit 109 for controlling such operation. The batteries 104 may be non-rechargeable batteries, for lithium batteries such as lithium sulphur dioxide or lithium manganese dioxide batteries.

Figure 4:
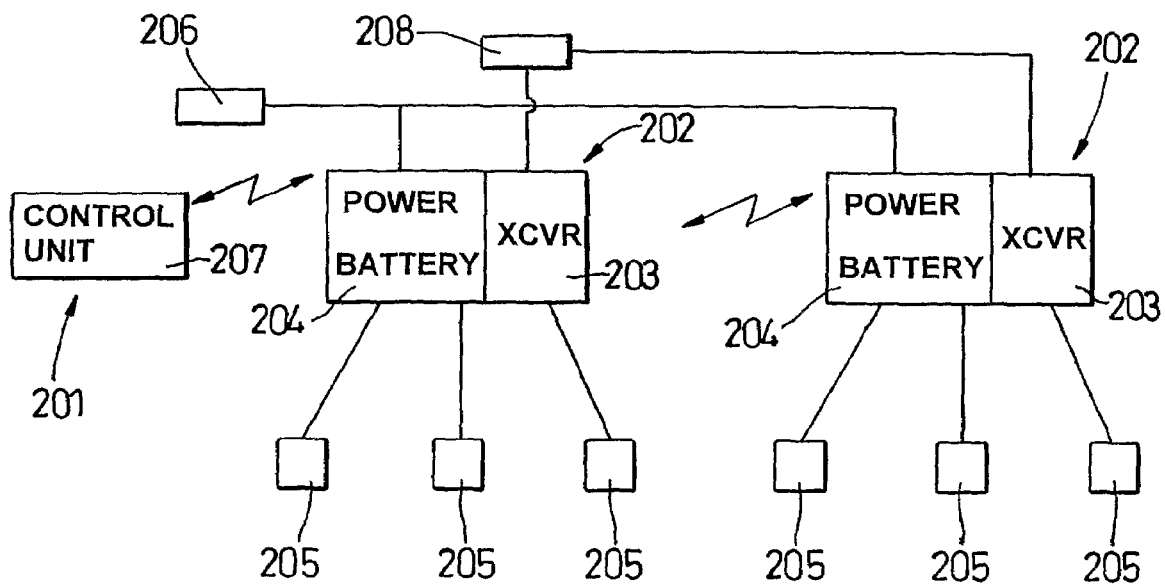
FIG. 4 shows diagrammatically a second embodiment of an emergency lighting system according to the present invention.

Referring now to FIG. 4, there is shown a second embodiment of an aircraft emergency lighting system according to the present invention. For convenience, like reference numerals in the series 200 are used to indicate parts corresponding to the first embodiment.

As shown in FIG. 4, each unit 202 is connected to a plurality of light sources 205 and acts as a hub to control operation of the light sources 205 according to whether the system is switched to the "off" state, the "armed" state or the "on" state as described previously.

The units 202 are typically mounted at spaced intervals along the length of the aircraft, usually on the ceiling and the associated lights 205 are arranged to provide illumination for an escape path in an emergency. The lights 205 may indicate a route to an exit, and/or illuminate the exit and/or an escape chute.

In other respects, the operation of this system will be understood from the description of the first embodiment.

As will be appreciated, hard wiring the light units 102/202 to the aircraft power supply does not significantly increase installation costs in a retro-fit solution, as the power supply is provided throughout the aircraft for the currently installed battery chargers and the time and material costs involved in connecting the light units to the aircraft power supply is relatively low.

However, employing wireless communication between the light units 102/202 and the diagnostic control panel 107/207 for monitoring the health/status of the light units via BITE provides benefits and advantages over a hard wired communication system, especially when retrofitting the system to replace an existing system where there is no wiring already in place for the BITE.

Furthermore, using the aircraft power supply under normal conditions provides a number of additional benefits and advantages. In particular, these can be summarised as follows 1. The back-up battery power supply is not drained by any inadvertent switch-on of the system, especially a system to be used in an emergency only, thereby avoiding the time and cost of having to replace primary (non-rechargeable) batteries or re-charge secondary (re-chargeable) batteries.

2. The useful life of the back-up battery power supply may be improved as full power is only drawn from the batteries in an emergency if the aircraft power supply fails thereby significantly reducing or potentially eliminating battery maintenance for the aircraft-lifetime.

3. The BITE can be operated without draining the back-up battery power supply enabling a wider range of functions and/or information to be carried out.

4. The units can be arranged to draw battery power only if the aircraft power supply is interrupted and the system is armed. In this way, the batteries are not drained when the aircraft is not in use and the aircraft power supply is shut down.

5. The system can be applied not only to emergency lighting to indicate and/or guide passengers to exits, but also to other systems and equipment that are required in an emergency, for example deployment of oxygen masks, automated fire extinguishers, sensor networks and monitoring systems within the aircraft.

6. In addition to wirelessly transferring the status information for the emergency lighting system, the communication network can be used to carry additional information for other systems. For example, the system can be configured to operate as a backbone for transferring remote sensor data through the aircraft without compromising the safety and security of the emergency lighting system.

7. The automated maintenance test procedure provides savings in time and money as well as enhancing reliability and safety by allowing any faulty units to be identified.

Although the emergency lighting systems described above are for use in an aircraft, it will be understood that the emergency lighting systems can be employed in other situations where it may be necessary to evacuate people in an emergency. For example, the invention includes emergency lighting systems in a train, coach, ship or other mass transportation system.

Furthermore, while the embodiments of FIGS. 2 to 4 have been described with reference to powered units for an emergency lighting system, it will be understood that the principles or concepts employed therein may be applied to other systems in which a back-up battery power supply may usefully employed to ensure operation of the system in an emergency. For example, on board safety systems such as smoke alarms, heat sensors, breathing equipment (drop-down oxygen masks) and the like may employ powered units with back-up batteries as described above.

Figure 5:
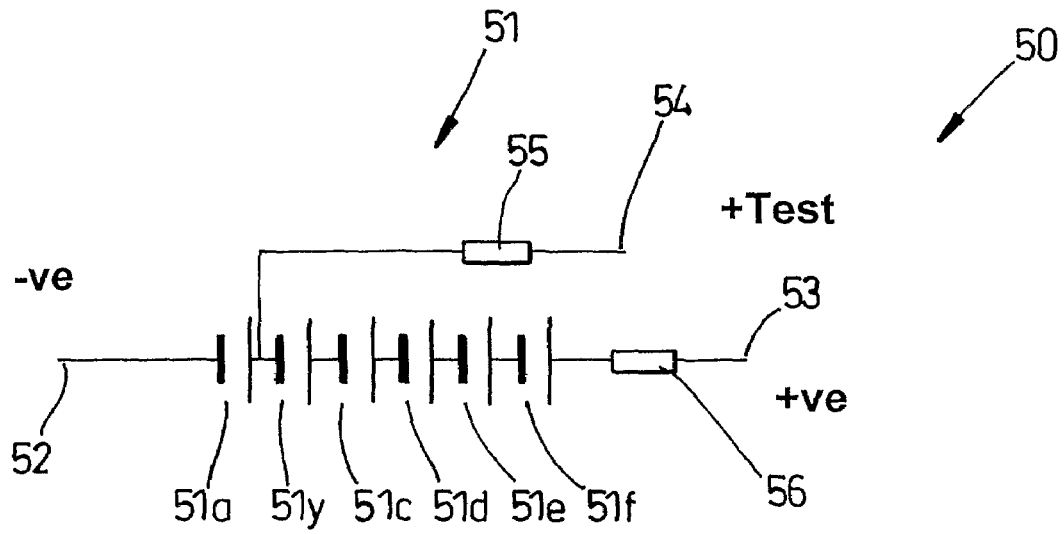
FIG. 5 depicts a wiring diagram for a battery according to a third embodiment of the present invention.

Referring now to FIG. 5 of the accompanying drawings, there is shown a wiring diagram 50 for a non re-chargeable (primary) battery 51, for example a lithium battery such as a lithium sulphur dioxide or lithium manganese dioxide battery, comprising a plurality of cells connected in series between contact pins 52,53. In this embodiment, the battery 51 has six cells 51a,b,c,d,e,f but it will be understood this is not essential and the number of cells may be chosen according to the intended application of the battery 51.

The end cell 1a is a sacrificial cell and has a lower initial power level than the remaining cells 51b,c,d,e,f which all have the same initial power level. A contact pin 54 for a test circuit (not shown) is connected between the sacrificial cell 51a and the next cell 51b. In this way, the negative contact 52 is used for both the test circuit (contact 54) and the supply circuit (contact 53).

In this embodiment, a 5-amp fuse 55 is provided between the sacrificial cell 51a and the contact pin 54 and a further 5 amp fuse 56 is provided between the cell 51f and the contact pin 53.

The sacrificial cell 51a is partially discharged to reduce the initial power level relative to the remaining cells 51b,c,d,e,f. The power level is reduced by a known amount to a pre-determined level, for example to 90% of the power level of the remaining cells.

All the cells 51a,b,c,d,e,f are subjected to the same conditions of power loads, temperature etc. As a result, battery drain through applied power loads and self-discharge is the same for each cell 51a,b,c,d,e,f and, when the power level of the sacrificial cell 51a reaches a pre-determined value, say 10% of the initial power level, the remaining cells 51b,c,d,e,f will have a higher power level corresponding to the initial discharge of the sacrificial cell 51a.

Accordingly, by monitoring the sacrificial cell 51a via the test circuit connected to contact pin 54 and providing a signal when the power level reaches the pre-determined value, the total available power in the battery from the other cells 51b,c,d,e,f is known with a high degree of accuracy without having to monitor and measure the power levels individually.

By selection of the initial power levels of the sacrificial cell 51a and the remaining cells 51b,c,d,e,f it is possible to provide a signal when the total available power reaches a minimum threshold value below which the battery 51 may need to be replaced. In this way, the battery can be designed according to the power requirements for a given application.

For example, we may employ the battery 51 in an emergency lighting system in an aircraft where full power is only drawn from the battery 51 to illuminate the light unit in an emergency, for example following failure of the aircraft main power supply, such as the emergency lighting systems described above in connection with FIGS. 1 to 4 of the accompanying drawings. In these circumstances it is important that the battery 51 has sufficient available power to operate the light unit for a pre-determined period of time to allow evacuation of the aircraft.

The test circuit may be designed to provide a visual and/or audible indication of the available battery power based on the power level of the sacrificial cell 51a. For example, a traffic light system may be employed to indicate if the battery passes/fails a test by illuminating a green light if there is sufficient available power to operate the light unit for the required period of time, an amber light if there is sufficient available power but the power level is low and the battery will need to be replaced, and a red light if there is insufficient available power. By providing a warning of low battery power, the aircraft can remain operational until it is convenient to replace the battery.

As will be understood, the sacrificial cell eliminates the need to monitor and measure accurately, the absolute power level of the battery at any given time. Rather the relative initial power levels of the sacrificial cell and remaining cells enables the power level to be monitored in a way that ensures there is sufficient available power remaining when the power level of the sacrificial cell reaches a pre-determined value for the intended application. Moreover, this monitoring is also effective where the battery is subjected to varying environmental conditions such as temperature that may affect the rate of self-discharge and provide a reliable indication when the battery may need to be replaced.

It will be understood that various improvements and modifications can be made to the above-described embodiment. For example, we may provide the sacrificial cell at the end of the battery as described or we may provide the sacrificial cell between the ends with a line out on either side (positive and negative) of the sacrificial cell to measure the potential across the sacrificial cell separately from the whole battery. We may provide the battery with more than one sacrificial cell and means for monitoring the cells to provide an indication of a range of available battery power levels.

Figure 6:
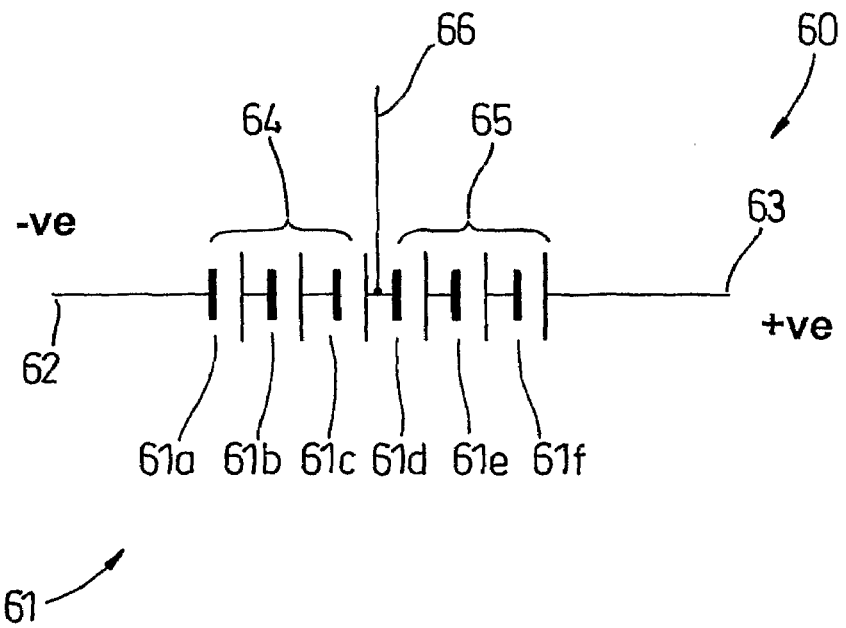
FIG. 6 depicts a wiring diagram for testing a battery of light unit of an emergency lighting system according to a fourth embodiment of the present invention.

Referring now to FIG. 6 of the accompanying drawings, there is shown a wiring diagram 60 for a non re-chargeable (primary) battery 61, for example a lithium battery such as a lithium sulphur dioxide or lithium manganese dioxide battery comprising a plurality of cells connected in series between contact pins 62,63. The cells are divided into two groups 64,65 each containing the same number of cells and a mid-battery tap 66 is provided to a test circuit (not shown) for monitoring and comparing the off-load voltage of each group of cells.

In this embodiment, the battery 61 has six cells 61a,b,c,d,e,f but it will be understood this is not essential and the number of cells may be chosen according to the intended application of the battery 61.

All the cells 61a,b,c,d,e,f are subjected to the same conditions of power loads, temperature etc. As a result, battery drain through applied power loads and self-discharge is the same for each cell 61a,b,c,d,e,f.

Accordingly, by monitoring and comparing the off-load voltage of each group of cells 64,65, a faulty cell in one of the groups 64,65 can be detected when the off-load voltages vary by more than a pre-determined amount and a visual and/or audible warning signal can be generated to indicate the battery 61 needs to be replaced.

The battery 61 may be employed in a light unit for an emergency lighting system in an aircraft where full power is only drawn from the battery to illuminate the light unit in an emergency, for example following failure of the aircraft main power supply. In these circumstances it is important that the battery 61 has sufficient available power to operate the light unit for a pre-determined period of time to allow evacuation of the aircraft.

The off-load test does not provide an indication of the power level (capacity) of the battery 61 and we therefore prefer to employ an on-load test of battery capacity and provide a visual and/or audible indication of the available battery power.

In one arrangement, a traffic light system (not shown) may be employed to indicate if the battery 61 passes/fails a test by illuminating a green light if there is sufficient available power to operate the light unit for the required period of time, an amber light if there is sufficient available power but the power level is low and the battery 61 will need to be replaced, and a red light if there is insufficient available power. By providing a warning of low battery power, the aircraft can remain operational until it is convenient to replace the battery 61.

As will be understood, the centreline voltage monitoring of groups of cells 64,65 eliminates the need to monitor and measure accurately, the absolute power level of each cell of the battery 61 at any given time. Rather, off-load testing enables the cells to be monitored in a way that ensures a faulty cell is detected allowing the battery 61 to be replaced. Moreover, the off-load testing is also effective where the battery 61 is subjected to varying environmental conditions such as temperature that may affect the rate of self-discharge and provide a reliable indication when the battery may need to be replaced.

It will be understood that various improvements and modifications can be made to the above-described embodiment. For example, we may arrange the cells in more than two groups, preferably with an equal number of cells in each group.

It will also be understood that the embodiments of FIGS. 5 and 6 are not limited to battery powered units for emergency lighting systems and can be used in any application of a battery powered device where it is desirable to monitor the battery power level and provide an indication when the battery may need to be replaced.

It will further be understood that the exemplary embodiments described herein are intended to illustrate the general principle and application of the invention and we do not intend to be limited to the specific features described herein. Moreover, any of the features described herein may be employed separately or in combination with any of the other features.

The invention claimed is:

1. An aircraft emergency lighting system comprising a plurality of units having communication devices arranged to communicate wirelessly with a master controller wherein each unit is wired to a common power supply for powering the unit in a first mode of operation and has its own back-up battery power supply for powering the unit in a second mode of operation, and wherein means is provided for off-load testing the back-up battery power supply of each unit and indicating if the unit is operational.

2. A system according to claim 1, wherein the back-up battery power supply comprises at least one non re-chargeable primary battery for each unit.

3. A system according to claim 1, wherein switch means is provided in the cockpit for switching the system between "off", "armed" and "on" states.

4. A system according to claim 3, wherein the aircraft includes a power supply and the units are wired to the aircraft power supply so that in the "off" state, power is supplied to the units when the aircraft power supply is operating and no power is drawn from the back-up battery power supply even if the aircraft power supply is interrupted for any reason.

5. A system according to claim 4, wherein, in the "armed" state, power is supplied to the units when the aircraft power supply is operating and the emergency lighting is turned off with no power being drawn from the back-up batteries, and, if the aircraft power supply is interrupted, the emergency lighting automatically comes on powered by the back-up battery power supply.

6. A system according to claim 5, wherein if the system is manually switched to the "on" state when the aircraft power supply is operating, the emergency lighting comes on powered by the aircraft power supply and no power is drawn from the back-up battery power supply and, if the aircraft power supply fails, the emergency lighting remains on powered by the back-up batteries.

7. A system according to claim 1, wherein the units include a timer to switch the emergency lighting off automatically after a predetermined period of time and/or when the battery power has reduced to a predetermined level.

8. A system according to claim 1, wherein each unit has a transceiver for receiving and transmitting information between the units and the master controller, and wherein each unit is provided with built-in test equipment (BITE) for carrying out off-load testing of the back-up battery power supply in response to a signal from the master controller and transmitting a pass/fail signal to the master controller.

9. A system according to claim 8, wherein the master controller comprises a diagnostic control panel, wherein the diagnostic control panel provides a report that identifies the location of each unit, whether a unit has passed or failed, and stores the report for use in monitoring the health of the system during the service life of the aircraft.

10. A system according to claim 9, wherein the control panel has means for providing a visual and/or audible indication whether the system passes or fails comprising a traffic light system with differently colored LEDs that are illuminated to indicate if the system has passed or failed.

11. A system according to claim 8, wherein the BITE is only operable when the system is in the "off" state, and the aircraft power supply is operating.

12. A system according to claim 1, wherein the back-up battery power supply for each unit comprises two batteries, one being an "operational" standby battery and the other being a "reserve" battery, wherein the reserve battery is completely disconnected from any part of the unit when the life of the "operational" battery exceeds a predetermined minimum level so that power is not drawn from the "reserve" battery, and wherein, when the 'operational' battery is 'out of life', the unit switches over to the "reserve" battery.

13. A system according to claim 12, wherein the unit detects when the "operational" battery is out of life by sensing when the operational voltage drops to a predetermined level under load.

14. A system according to claim 1, wherein the back-up battery power supply comprises at least one battery having a plurality of cells connected in series wherein at least one of the cells has a lower initial charge than the remaining cells, wherein the cell having the lower initial charge is a "sacrificial cell" and mean is provided for monitoring the power level of the sacrificial cell to determine when power remaining in the battery has reached a predetermined minimum threshold value.

15. A system according to claim 1, wherein the back-up battery power supply comprises at least one battery having a plurality of cells arranged in at least two groups and a characteristic of each group of cells is monitored and compared for detecting a fault in any of the cells.

16. A system according to claim 15, wherein the monitored characteristic is centerline voltage, wherein the centerline voltage is monitored in an off-load condition and an indication provided when a fault is detected and the battery needs to be replaced.

17. A system according to claim 1, wherein means is provided for on-load testing of the back-up battery power supply to measure the capacity of the back-up battery power supply and indicate when the power level in the battery back-up power supply approaches that at which it needs to be replaced.

18. An aircraft emergency lighting system comprising: a plurality of units having communication devices arranged to communicate with a master controller, wherein each unit is wired to a common power supply for powering the unit in a first mode of operation and has its own back-up battery power supply for powering the unit in a second mode of operation, wherein the back-up battery power supply includes a primary battery and means is provided for testing the battery off-load by comparing a characteristic of two groups of cells of the primary battery to determine when the battery needs to be replaced.

19. An aircraft emergency lighting system comprising: a plurality of units having communication devices arranged to communicate with a master controller, wherein each unit is wired to a common power supply for powering the unit in a first mode of operation and has its own back-up battery power supply for powering the unit in a second mode of operation, wherein the back-up battery power supply includes a first operational primary battery and a second reserve primary battery and the unit includes means for monitoring the first operational battery and switching over to the second reserve battery when the first operational battery is out of life.

20. An aircraft emergency lighting system comprising: a plurality of units having communication devices arranged to communicate with a master controller, wherein each unit is wired to a common power supply for powering the unit in a first mode of operation and has its own back-up battery power supply for powering the unit in a second mode of operation, wherein the back-up battery power supply includes a primary battery having a plurality of cells, wherein one of the cells is configured as a sacrificial cell having a lower initial charge than the remaining cells, and means is provided for monitoring the sacrificial cell to determine when the battery needs to be replaced.

21. An emergency lighting system comprising: a plurality of units having communication devices arranged to communicate wirelessly with a master controller, wherein each unit is wired to a common power supply for powering the unit in a first mode of operation and has its own back-up battery power supply for powering the unit in a second mode of operation, wherein the back-up battery power supply includes at least one primary battery and means is provided for testing the battery in response to a signal from the master controller and transmitting a signal to the master controller representative of the condition of the battery for determining if the unit is operational and if the battery needs to be replaced.

* * * * *